US006255793B1

(12) United States Patent
Peless et al.

(10) Patent No.: US 6,255,793 B1
(45) Date of Patent: *Jul. 3, 2001

(54) NAVIGATION METHOD AND SYSTEM FOR AUTONOMOUS MACHINES WITH MARKERS DEFINING THE WORKING AREA

(75) Inventors: Ehud Peless, Even Yehuda; Shai Abramson, Ramat Gan; Gideon Dror, Tel Aviv, all of (IL)

(73) Assignee: Friendly Robotics Ltd., Kadima (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/554,691

(22) Filed: Nov. 7, 1995

(30) Foreign Application Priority Data

May 30, 1995 (IL) ........................................................ 113913

(51) Int. Cl.[7] ........................................................ G05D 1/00
(52) U.S. Cl. ........................ 318/580; 180/168; 56/10.2 F
(58) Field of Search .................................. 180/167–169; 318/568.12, 568.16, 568.17, 580, 587; 364/424.02, 449, 443, 459, 461; 15/319; 56/10.2 K, 10.2 A, 10.2 F, 10.2 J

(56) References Cited

U.S. PATENT DOCUMENTS

| 2,751,030 | 6/1956 | Null . |
| 3,381,456 | 5/1968 | Taylor . |

(List continued on next page.)

FOREIGN PATENT DOCUMENTS

| 3733939 A1 | 4/1988 | (DE) . |
| 3816622 A1 | 11/1989 | (DE) . |
| 3916730 A1 | 12/1989 | (DE) . |

(List continued on next page.)

OTHER PUBLICATIONS

"Air Regulations Challenge Outdoor Engine Manufactures" in Discount Store News v.32, n 16, pp, 32 and 34. (Aug. 16, 1993).

(List continued on next page.)

*Primary Examiner*—Jonathan Salata
(74) *Attorney, Agent, or Firm*—Skjerven Morrill MacPherson LLP; David W. Heid

(57) ABSTRACT

A method for automatically operating a robot, attached to a lawnmower or other unmanned machine, within an enclosed area is disclosed. The method includes the steps of: 1) providing the following elements: a proximity sensor positioned on the robot, a boundary along the perimeter of the working area and along the perimeter of each area enclosed in the working area in which the robot should not operate, the boundaries being detectable by the proximity sensor, a processing unit connected to the proximity sensor and receiving an input therefrom, a navigation unit on the robot to determine the coordinates of the robot relative to an arbitrary origin, a direction finder, and a memory to store values generated by the processing unit; and 2) causing the robot to move along each of the boundaries provided around or within the working area, to detect the boundaries and to memorize their shape, and to store in the memory values representative of the coordinates of the boundaries, thereby to generate a basic map of the working area. When the robot is to operate within the area, the method includes the steps of: (a) causing the robot to start from a starting point having known coordinates within the basic map of the working area; (b) continuously determining the coordinates of the robot by analyzing data obtained from the navigation unit and by detecting the vicinity of a boundary; and (c) correcting the actual position of the robot on the basic map by comparing the calculated and the actual coordinates of each detected boundary.

48 Claims, 10 Drawing Sheets

U.S. PATENT DOCUMENTS

| | | | |
|---|---|---|---|
| 3,425,197 | 2/1969 | Kita. | |
| 3,507,349 | 4/1970 | Comer et al.. | |
| 3,550,714 | 12/1970 | Bellinger. | |
| 3,570,227 | 3/1971 | Bellinger. | |
| 3,650,097 | 3/1972 | Nokes. | |
| 3,789,939 | 2/1974 | Geislinger. | |
| 3,892,282 * | 7/1975 | Wule | 180/6.5 |
| 3,924,389 | 12/1975 | Kita. | |
| 3,925,972 | 12/1975 | Anderson. | |
| 4,119,900 | 10/1978 | Kremnitz. | |
| 4,133,404 | 1/1979 | Griffin. | |
| 4,180,964 | 1/1980 | Pansire. | |
| 4,184,559 | 1/1980 | Rass. | |
| 4,219,092 * | 8/1980 | Richter | 180/169 |
| 4,318,266 | 3/1982 | Taube. | |
| 4,482,960 | 11/1984 | Pryor. | |
| 4,500,970 | 2/1985 | Daemmer. | |
| 4,545,453 | 10/1985 | Yoshimura et al.. | |
| 4,566,032 * | 1/1986 | Hirooka et al. | 180/168 |
| 4,573,547 | 3/1986 | Yoshimura et al.. | |
| 4,603,753 | 8/1986 | Yoshimura et al.. | |
| 4,613,804 | 9/1986 | Swenson. | |
| 4,653,002 | 3/1987 | Barry. | |
| 4,658,928 | 4/1987 | Seo. | |
| 4,674,048 | 6/1987 | Okumura. | |
| 4,694,639 | 9/1987 | Chen et al.. | |
| 4,777,785 | 10/1988 | Rafaels. | |
| 4,800,978 | 1/1989 | Wasa et al.. | |
| 4,809,178 * | 2/1989 | Ninomiya et al. | 318/587 |
| 4,809,489 | 3/1989 | Johansson. | |
| 4,813,218 | 3/1989 | Clacsson. | |
| 4,831,813 | 5/1989 | Jonas et al.. | |
| 4,919,224 | 4/1990 | Shyu et al.. | |
| 4,933,864 | 6/1990 | Evans, Jr. et al.. | |
| 4,934,130 | 6/1990 | Johansson et al.. | |
| 4,962,453 | 10/1990 | Pong et al.. | |
| 4,987,729 | 1/1991 | Paytas. | |
| 5,001,635 | 3/1991 | Yasutomi et al.. | |
| 5,007,234 | 4/1991 | Shurman et al.. | |
| 5,051,906 | 9/1991 | Evans, Jr. et al.. | |
| 5,068,790 | 11/1991 | Wellman. | |
| 5,083,256 * | 1/1992 | Trovato et al. | 364/148 |
| 5,155,775 | 10/1992 | Brown. | |
| 5,163,273 | 11/1992 | Wojtkowski et al.. | |
| 5,170,352 * | 12/1992 | McTamaney et al. | 364/424.031 |
| 5,189,612 | 2/1993 | Lemercier et al.. | |
| 5,204,814 | 4/1993 | Noonan et al.. | |
| 5,213,176 | 5/1993 | Oruku et al.. | |
| 5,216,605 | 6/1993 | Yardley et al.. | |
| 5,258,911 | 11/1993 | Wellman et al.. | |
| 5,321,614 | 6/1994 | Ashworth. | |
| 5,351,778 | 10/1994 | Shigemi et al.. | |
| 5,353,224 * | 10/1994 | Lee et al. | 318/587 |
| 5,369,347 * | 11/1994 | Yoo | 318/587 |
| 5,402,051 * | 3/1995 | Fujiwara et al. | 364/424.02 |
| 5,414,625 * | 5/1995 | Hattori | 364/424.02 |
| 5,426,584 * | 6/1995 | Kamimura et al. | 364/424.029 |
| 5,438,817 * | 8/1995 | Nakamura | 56/10.2 A |
| 5,444,965 | 8/1995 | Colens | 56/10.2 A |
| 5,507,137 | 4/1996 | Norris. | |
| 5,525,882 | 6/1996 | Asaka et al.. | |
| 5,528,888 * | 6/1996 | Miyamoto et al. | 56/10.2 F |
| 5,548,511 | 8/1996 | Bancroft. | |
| 5,572,856 | 11/1996 | Ku. | |
| 5,758,298 | 5/1998 | Guldner. | |
| 5,956,250 | 9/1999 | Gudat et al.. | |

FOREIGN PATENT DOCUMENTS

| | | |
|---|---|---|
| 2 614 428 | 10/1988 | (FR). |
| 2 696 569 | 4/1994 | (FR). |
| 2142447A | 1/1985 | (GB). |
| 2148490 | 5/1985 | (GB). |
| 2204434 | 11/1988 | (GB). |
| WO 91/09356 | 6/1991 | (WO). |
| WO 92/09941 | 6/1992 | (WO). |

OTHER PUBLICATIONS

"Navigating an Articulated Vehicle and Reversing with a Trailer", by Larsson, U., Zell, C., Hyppa, K., Wernersson, A., in IEEE Comput. Soc. Press, Los Alamitos, CA USA vol. 3, pp. 2398–2404. (1994).

"A Wide Angle Vision System for Mobile Robots", by Oh, S.J., Ahn, D.J., Hall, E.L., in Proceedings IEEE International Symposium on Intellectual Control, pp. 490–498 (1989).

"Guidance of a Mobile Robot Using an Omnidirectional Vision Navigation System" by Oh, S.J., and Hall, E.L., in Proceedings of the SPIE–The International Society for Optical Engineering, vol. 852, Mobile Robots II, pp. 288–300 (1987).

"Vision guided intelligent robot design and experiments", by Slutzky, G.D. and Hall, E.L., in Proceedings of the SPIE—The International Society for Optical Engineering, vol. 848, pp. 64–70 (1987).

"Calibration of an omnidirectional vision navigation system using an industrial robot", by, Oh, S.J., and Hall, E.L., in Optical Engineering, vol. 28, No. 9, pp. 955–962. (Sep. 1989).

"Hybrid navigational control scheme for autonomous platforms", by Holland J., Everett, H.R., Gilbreath, G.A. Proceedings of the SPIE–The International Society of Optical Engineering, vol. 1388, Mobile Robots V, pp. 291–298. (1990).

"Service Robots the Hanover Fair", by Hollingum, J. in Industrial Robot, vol. 21, No. 5, pp. 15–19. (1994).

"Automatic Operation for a Robot lawn mower", by Huang, Y. Y., Cao, Z.J. Kattan, E.U., and Hall, E.L., in Proceedings of SPIE– The International Society for Optical Engineering, vol. 727, Mobile Robots, pp. 344–354. (1986).

* cited by examiner

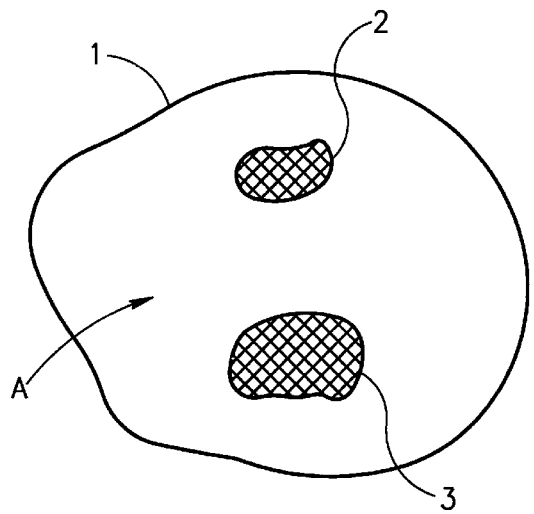
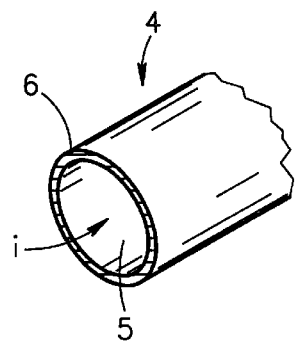
FIG.1
FIG.2
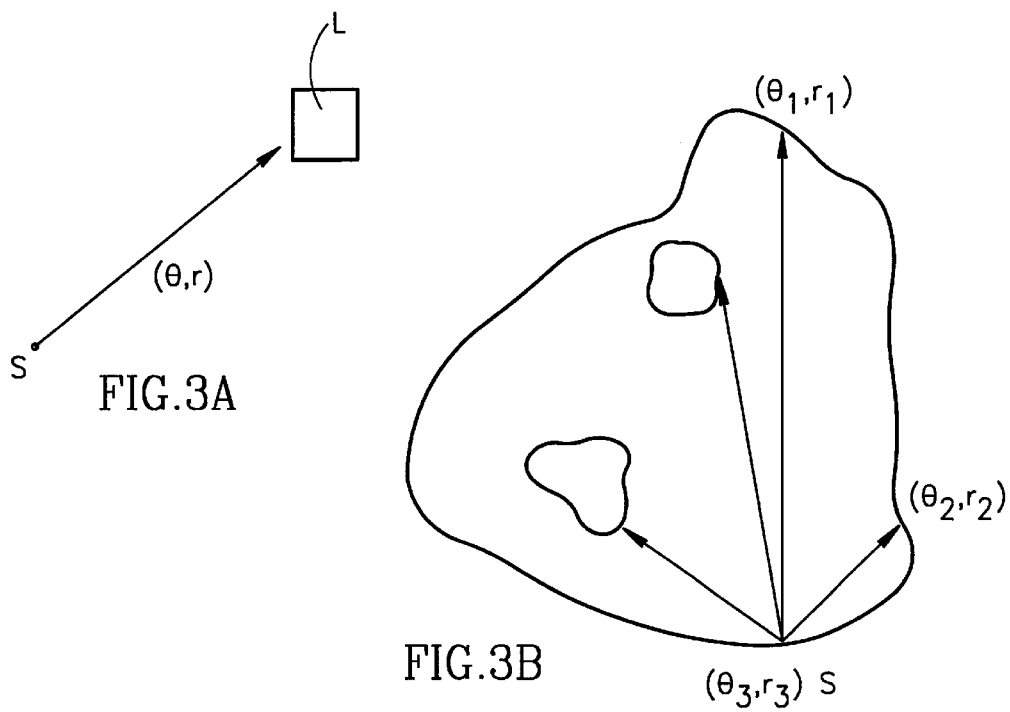
FIG.3A
FIG.3B

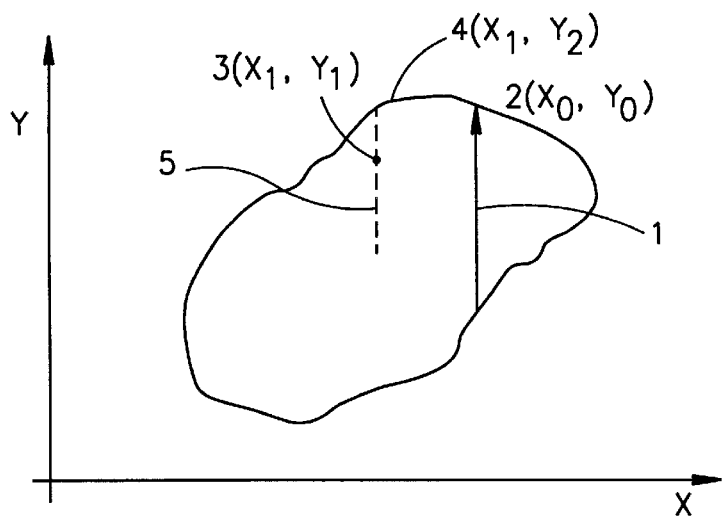

THE ROBOT TRAVELS IN THE Y DIRECTION AS INDICATED IN 1

↓

THE EDGE OF THE WORKING AREA IS DETECTED. THE ROBOT IS PHYSICALLY AT POINT 2, BUT DUE TO ACCUMULATED LOCATION ERRORS THE LOCATION SYSTEM OF THE ROBOT READS THE CURRENT LOCATION TO BE 3.

↓

THE NAVIGATION SYSTEM CALCULATES THE EXTRAPOLATION OF THE ASSUMED LINE OF MOVEMENT (5) UNTIL IT INTERSECTS WITH THE MEMORIZED EDGE AT POINT 4. THE FOLLOWING LOCATION CORRECTION IS THEN PERFORMED :

CURRENT LOCATION BECOMES $(X_1, Y_2)$ INSTEAD OF $(X_1, Y_1)$

FIG.5A

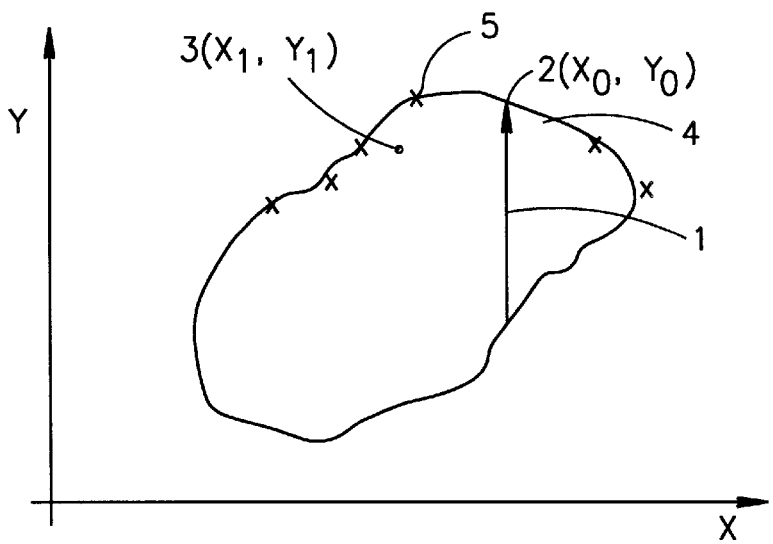

| THE ROBOT TRAVELS IN THE Y DIRECTION AS INDICATED IN 1 |
|---|

↓

| THE ROBOT DETECTS THE EDGE OF THE AREA AND IS PHYSICALLY AT POINT 2, ALTHOUGH THE LOCATION SYSTEM READS POINT 3, DUE TO THE ACCUMULATED NAVIGATION ERRORS |
|---|

↓

| THE ROBOT ALSO DETECTS MARKERS 4 AND 5, THE COORDINATES OF WHICH ARE STORED IN THE NAVIGATION SYSTEM SINCE THE INITIATION LOOP AROUND THE BOUNDARIES |
|---|

↓

| THE SYSTEM CALCULATES THE CURRENT LOCATION (2) ACCORDING TO THE DISTANCE FROM MARKERS 4 AND 5 AND CORRECTS THE CURRENT LOCATION TO BE $(X_0, Y_0)$ |
|---|

FIG.5B

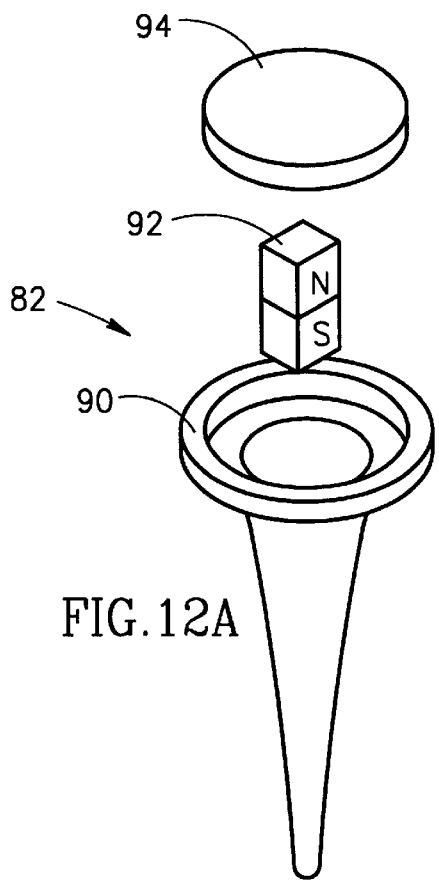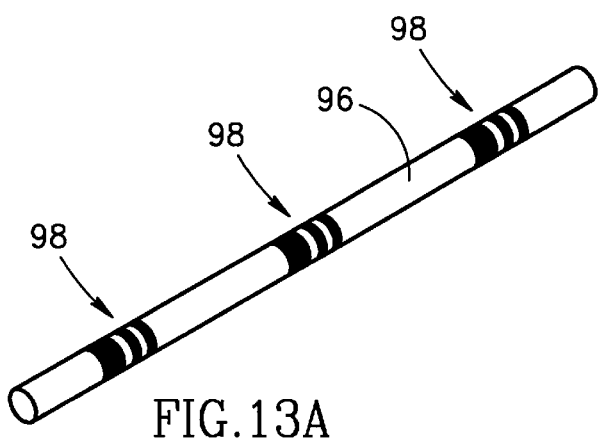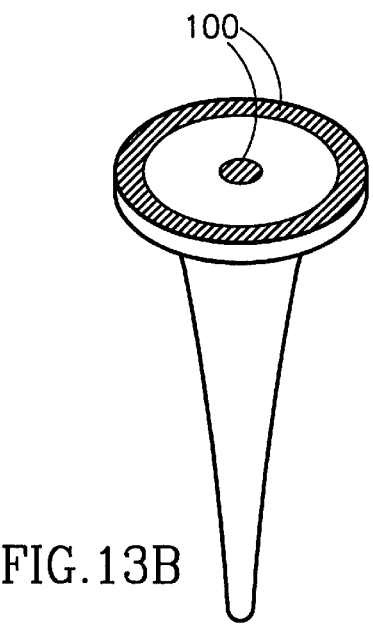
FIG.12B
FIG.12A
FIG.13A
FIG.13B

NAVIGATION METHOD AND SYSTEM FOR AUTONOMOUS MACHINES WITH MARKERS DEFINING THE WORKING AREA

CROSS-REFERENCES TO RELATED APPLICATIONS

This patent application is related to PCT Application Ser. No. PCT/US95/07045, filed Jun. 6, 1995, and U.S. patent application Ser. No. 08/952,639, a 371 of PCT/US95/07045, filed Jan. 9, 1998, now abandoned.

FIELD OF THE INVENTION

The present invention relates to a method and related systems for navigation in an enclosed area. More particularly, the invention relates to method and apparatus which can be used to cause an automated device to move and to perform predetermined tasks within an enclosed area.

BACKGROUND OF THE INVENTION

The use of automated devices is widespread nowadays, and finds countless applications. For instance, robots perform very precise and delicate tasks in the construction of electronic devices, or in medicine and aviation. Robots are also used in uses which require motion, notably, for automatic warehouses, where goods are retrieved and stored by means of computer-actuated robots. Other applications include, e.g., fetching raw materials in the course of industrial manufacturing, and removing and packaging finished pieces. In everyday's life, attempts have also been made to exploit robots for lawn mowing and for vacuum cleaning.

The major drawback of mobile robots, which the art has so far been unable to overcome, is the fact that their movements are limited to well predefined paths, normally requiring that they move along rails, or that they be provided with expensive navigation signs, positioned within the area in which they move, which operate as "stations" which redefine the exact position of the robot, and from which the program may direct the robot to the next station. These intermediate signs are expensive, take up space, and are inconvenient to use, since they must be very precisely positioned and cannot be easily moved.

Another approach involves providing an area delimited by boundaries recognizable by the robot, and permitting the robot to effect a random walk therein, during which random walk it carries out its tasks. This approach entails severe drawbacks: first of all, when the robot moves within a predefined area by random walk, there is no way to ensure that the whole area will be covered by the tool which must operate thereon. As a result, even though the robot may operate for a long period of time, unworked areas may be left at the end of the operation. Secondly, if the area to be worked is irregular, or if it presents "islands", viz. areas which must not be worked, the random walk may lead to imperfect operation around such islands, as well as at those locations where the perimeter is of irregular shape. Thirdly, because the operation of the robot is not programmed to obtain a predetermined coverage, it is necessary to allow the random walk to go on for a long period of time, so as to increase the chances of covering a major portion of the area to be worked. This is not only energy consuming, but also leads to an increased wear of the equipment, and may also be environmentally undesirable due, e.g., to noise or other pollution caused by the operation of the robot. Even if the robot is operated by sun energy, most of the aforesaid problems are not overcome, and additional problems exists, connected with such a mode of operation. For instance, the robot may not work properly in areas of the world where sun radiation is scarce or low, and may be inoperative for substantial parts of the day, e.g., on cloudy weather.

A further approach involves preprogramming the robot with a blueprint of its designated area of operation, such as a floor map of a building in which a robot is to operate. This approach has two major drawbacks:

a) it requires preprogramming by the user, which makes in unpractical for extensive consumer use; and b) it requires that such preprogramming is repeated each time something changes in the work area.

It is therefore clear that it would be highly desirable to be able to provide means by which automated mechanisms may move and perform their task within a predetermined area, without being hindered by the need for predefined paths and rails, or by intermediate navigation signs or preprogramming, and which may carry out their task in a predetermined manner, without relying on random occurrences and/or on unstable energy sources.

SUMMARY OF THE PRESENT INVENTION

It has now been found, and this is an object of the present invention, that it is possible to free automated mechanisms operating within an enclosed zone from the need for pre-programming or predefined paths and rails, and from the need for intermediate navigation aids, and this to overcome the drawbacks of the prior art and to provide means by which a robot may perform its tasks within an enclosed area in a manner free from such limitations, with high precision and in a minimal period of time.

It is an object of the present invention to provide a navigation method which fulfills the aforementioned goals.

It is another object of the invention to provide means which can be used in systems utilizing the method of the invention.

Other objects of the invention will become apparent as the description proceeds.

The method for automatically operating a robot within an enclosed area, according to the invention, comprises the steps of:

providing a boundary along the perimeter of the working area, the said boundary being detectable by a proximity sensor;

providing boundaries along the perimeter of each area enclosed in the working area, in which it is desired that the robot should not operate, the said boundaries also being detectable by a proximity sensor;

providing a proximity sensor positioned on the robot;

providing processing means connected to the said proximity sensor and receiving an input therefrom;

providing location means on the said robot, to determine the coordinates of the robot relative to an arbitrary origin, at any specific time;

providing direction finding means;

providing memory means to store values generated by the said processing means and, optionally, by the said location means;

causing the robot to move along each of the boundaries provided around or within the said working area, to detect the said boundaries and to memorize their shape, and to store in the memory means values representative of the coordinates of the said boundaries, relative to an arbitrary origin, thereby to generate a basic map of the working area;

when the robot is to operate within the said area:
(a) causing the robot to start from a starting point having known coordinates within the basic map of the working area;
(b) continuously determining the coordinates of the robot by analyzing data obtained from the location means and by detecting the vicinity of a boundary; and
(c) correcting the actual position of the robot on the basic map by comparing the calculated and the actual coordinates of each detected boundary.

By "robot" it is meant to indicate any autonomously operating device, which may carry out pre-programmed tasks with one or more tools, while moving in the process from one location to another.

According to a preferred embodiment of the invention, the location means comprise movement measuring means, such as an odometer or the like device, to measure the distance traveled by the robot, e.g., by measuring the number of revolutions of a wheel. As stated, direction finding means are also provided, so as to provide information on the direction in which the robot travels at any given time, which is needed in order to determine the coordinates of the robot on the map. The direction finding means can be of any suitable type, e.g., may comprise a compass.

While, as stated, it is an object of the invention to utilize relatively inexpensive devices for the operation of the robot, it is of course possible to employ more expensive and sophisticated equipment, without exceeding the scope of the invention. Thus, for instance, it is possible to employ range-finding means, such as a laser range-finder or RF range finders, to determine the distance of the robot from one or more given locations, at any given time, instead of, or in addition to, using an odometer or the like device to measure the distance traveled. However, any such modifications will be apparent to the skilled person, and therefore are not discussed herein in detail.

According to a preferred embodiment of the invention, the boundary which is detectable by a proximity sensor comprises a metallic wire through which electric current flows, and the proximity sensor comprises a magnetic field detector. According to another preferred embodiment of the invention, the boundary which is detectable by a proximity sensor comprises passive metallic means which is excitable by a magnetic field, and the proximity sensor comprises an electric field detector. In still another preferred embodiment of the invention the boundary which is detectable by a proximity sensor comprises passive magnetic means, and the proximity sensor comprises a magnetic field detector. Of course, the boundary may be marked by continuous or by discontinuous marking means, or by combinations thereof.

In still another alternative embodiment of the invention, the boundary which is detectable by a proximity sensor comprises a guide wire through which an acoustic signal passes, and the proximity sensor comprises an acoustic detector.

A further improvement in the precision of the determination of the actual coordinates of the robot on the map, at any given time, can be obtained by further providing on the boundaries a plurality of individually recognizable markers. Thus, when the robot reaches the boundaries, it not only identifies them by the proximity sensor, but may also receive the exact coordinates on the boundaries assigned to the specific marker it has detected. According to a preferred embodiment of the invention, when provided, the markers are substantially located at even distances from one another. Suitable markers will be easily recognized by the skilled person, and may comprise, e.g., an RF tag or magnetic tag.

As stated, according to another preferred embodiment of the invention, the distance-measuring means comprise an odometer or the like device, coupled to the wheels of the robot.

As stated, the robot, when initialized, moves along the boundaries and memorizes their shape. Such memorization may be carried out in a number of ways. For instance, the shape can be memorized by taking continuous or discontinuous readings of the compass and the odometer, and any such readings are then continuously integrated, to give the full coordinates of the boundaries.

The method of the invention can be exploited in a variety of uses, and is not limited to any particular field of application. One particularly interesting use, however, to which reference will be made also hereinafter for the purpose of exemplification, is when the robot is coupled to a lawn mower. Such robot permits to mow the lawn in the absence of the owner, and at any suitable time, or to vacuum clean any predetermined premises.

Of course, safety means should preferably be provided to ensure safe operation of the robot, for instance, automatic shut-off of the robot should be provided, coupled to logic circuitry, to ensure that the operation of the robot is discontinued if one of a number of contemplated possibilities takes place, for instance, if the measured distance traveled without encountering a boundary exceeds by a threshold value the maximal linear distance within the bounded area, as calculated from the map of the boundaries, this may mean that the robot has exited the boundaries due, for instance, to a malfunctioning of the system due to which the proximity sensor has failed to identify the boundary. Other required safety means will be easily recognized by the skilled person, according to the type of robot and the intended use thereof.

The invention is further directed to an automated robot for operation within an enclosed area, comprising:
a proximity sensor positioned on the robot;
processing means connected to the said proximity sensor and receiving an input therefrom;
location means, to determine the coordinates of the robot relative to an arbitrary origin, at any specific time;
direction finding means; and
memory means to store values generated by the said processing means and, optionally, by the said location means.

The term "proximity sensor", as used herein, indicates any device which is capable of detecting that the boundary of the working area is near. This may include, e.g., magnetic field detectors, acoustic signal detectors, bar code readers, resonance tag meters, transceivers, etc.

The invention also encompasses a system for automatically operating a robot within an enclosed area, comprising:
boundary means suitable for positioning along the perimeter of the working area, and of each area enclosed in the working area, in which it is desired the robot not to operate, the said boundary means being detectable by a proximity sensor;
a robot provided with a proximity sensor;
processing means on said robot, connected to the said proximity sensor and receiving an input therefrom;
distance-measuring means on the said robot, to measure the distance of the robot from a given starting point, at any specific time;
direction finding means;

memory means to store values generated by the said processing means and, optionally, by the said distance measuring means and/or direction finding means; and motion means, to cause the robot to move.

In accordance with a further embodiment of the invention, a method for automatically cutting a lawn is provided. The method includes the steps of:

providing a lawnmower with a robot and at least a plurality of lawn height sensors;

cutting a first swath of lawn in a first direction;

performing a maneuver, under control of the robot and in response to output of the lawn height sensors, in a second direction generally opposite of the first direction to bring said lawnmower to a location parallel to but overlapping the first swath by a predetermined percentage as indicated by the different output of the lawn height sensors;

cutting a second swath of lawn parallel to the first swath while continually monitoring the lawn height output of said lawn height sensors thereby to ensure that the percentage of overlap is generally maintained;

repeating the steps of performing a maneuver and cutting a second swath for further swaths of lawn, wherein the previously cut lawn is denoted by said first swath of lawn and the swath to be cut is denoted by the second swath of lawn.

The maneuver can be an S-shaped maneuver and the grass height sensor can include the following elements:

a housing;

a rotatable wing against which grass can push, the wing having a pin attached thereto;

a fixed second pin, connected to the housing;

a spring attached around said pin, wherein the ends of the spring press against opposite sides of the wing and opposite sides of the fixed pin; and means for measuring the angle of rotation of the rotatable wing.

BRIEF DESCRIPTION OF THE DRAWINGS

The present invention will be understood and appreciated more fully from the following detailed description taken in conjunction with the drawings in which:

FIG. 1 schematically shows an enclosed area within which a robot must operate, the shaded areas representing "islands" in which the robot must not enter;

FIG. 2 shows, in cross-section, a boundary of FIG. 1, according to a particular embodiment of the invention;

FIG. 3(A and B) illustrates the method of the invention, using polar coordinates;

FIG. 5(A and B) is a flow-sheet of an example of a location correction process, according to one preferred embodiment of the invention;

FIGS. 12A, 12B, 13A, 13B, 14A, 14B, 15 and 16 are schematic illustrations of various types of boundary markings useful in the embodiments of FIGS. 11A and 11B.

DETAILED DESCRIPTION OF PREFERRED EMBODIMENTS

Figure 4:
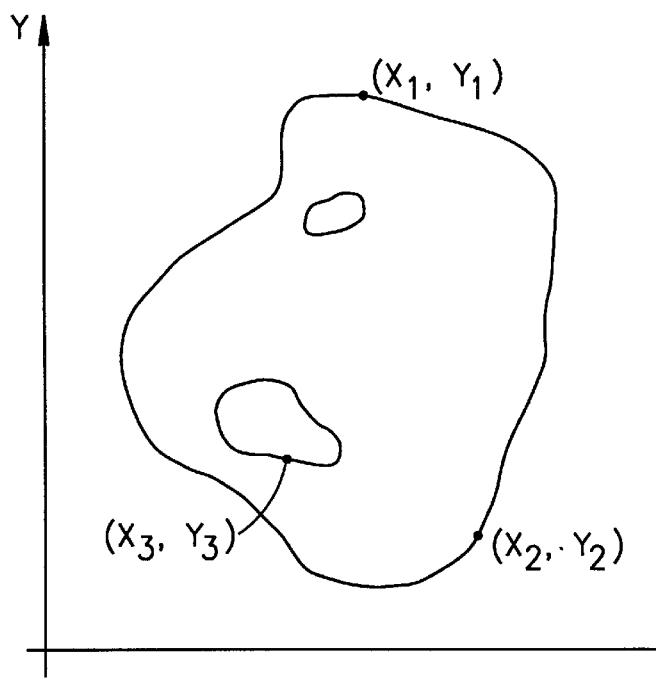
FIG. 4 illustrates the method of the invention, using Cartesian coordinates.

The present invention will be better understood through the following illustrative and non-limitative description of preferred embodiments.

Looking now at FIG. 1, the working area in which the robot must operate, indicated at "A", is enclosed by a boundary 1. Within the working area there are "islands" in which the robot must not penetrate, which are shadowed and enclosed by boundaries 2 and 3. According to one embodiment of the invention, the robot is an automated lawn mower, and the area A is a lawn. Islands 2 and 3 may be, e.g., trees and their vicinities or flower beds. Thus, we wish the mower to operate only in areas in which grass grows, and to avoid other areas. Alternatively, the robot can be coupled to a floor sweeper or a floor polisher or any other device which has to scan a flat surface.

As stated, according to one particular embodiment of the invention, the boundaries 1, 2 and 3 may comprise a conducting wire. This type of boundary is shown in cross-section in FIG. 2, which shows a wire 4, comprising a metallic core 5 and a plastic outer layer 6. A current "i" is caused to flow through the wire, thus generating a magnetic field along the wire. The intensity of the current may be very low, since it is not necessary that the magnetic field be sensed at a great distance from the boundary, and it is sufficient that it be felt in the close vicinity of the wire. The magnetic field is sensed, according to this particular embodiment of the invention, by a magnetic field sensor provided on the lawn mower. The magnetic field and the sensor to sense it are conventional and well known in the art, and therefore are not described here in detail, for the sake of brevity.

Taking the lawn mower as an example, but it being understood that the invention is in no way limited to its use with a lawn mower, or with any other particular device, the invention operates as follows. A coordinates system is defined, as well as a starting point. FIG. 3A shows a lawn mower L relative to the starting point "S" within the lawn, the lawn mower L being at a point (θ,r) viz. at a distance r, which is measured by measuring the movement of the mower, and at an angle θ from starting point S, which is measured by means of a compass. Thus, as shown in FIG. 3B, any point within the enclosed area S will have a unique polar coordinate.

When it is desired to teach the robot the boundaries of its task, the lawn mower is caused first to move around the boundary 1 of FIG. 1. The memory means of the robot memorize the coordinates of the boundary 1, relative to starting point S. Throughout this teaching movement, the boundary sensor positioned on the robot (not shown) senses the boundary 1. Similarly, the boundaries 2 and 3 are sensed for the first time by the robot, and memorized for future use. The robot now has an initial map of the area, similar to what is shown in FIG. 3B, each point having been assigned a coordinate. The set of coordinates so created will be termed "the map" of the working area.

When it is desired to mow the lawn, the robot is brought to starting point S, and it is started according to a set of instructions which has been pre-programmed, and which may be different for each different task. For instance, a circular lawn may be better looking if mowed in circles, while a soccer field requires back-and-forth mowing. An automated lawn mower according to the invention may further be provided with a number of pre-set programs, from which the user can choose.

The robot, as said, is further provided with distance-measuring means, such as an odometer or the like device. However, these devices are not fully accurate, and may provide only approximate distance values for any given position. The error in the measurement of the distance may derive from a variety of reasons, e.g., the slipping of wheels on a moist lawn, uneven ground, etc., and the error may build up to quite a substantial extent, impairing the ability of the robot to complete its task with a high degree of precision. While, of course, precise measuring means exist, such as laser distance measurements, these are expensive and/or require calibration targets located in or around the working area. It is a purpose of the invention to avoid the use of such expensive and complicated distance-measuring means.

According to the invention, therefore, the robot starting a task continuously compares the distance measured by the odometer or other distance measuring device, with the distance from an earlier position to the boundaries in the angular coordinate it is following. If the boundary is detected earlier than anticipated according to this comparison (or, in other words, if the difference between the distance according to the map and the measured distance is negative), the robot continues to move until the boundary is detected. If the difference between the distance according to the map and the measured distance is positive, or in other words, if the boundaries are encountered earlier than expected, actual value of the coordinate is corrected to be that of the map.

The starting point will initially be the point "S", and correction of distance errors will be effected relative to this point. As work proceeds, of course, the starting point may be updated to be another point within the area, e.g., a meeting point with the boundaries, for comparison purposes with the map of the area.

Similarly, the robot has been pre-programmed to avoid "islands", but will detect an island according to the actual position of the boundary detected, and will correct its present working map based on the detection of the boundary and the original map. As will be understood by the skilled person, the larger the number of bounded areas, the higher the precision of the correction of the actual working map., Therefore, the islands actually help in keeping precision and correcting the actual working map. therefore, if the working area is particularly large, it may be desirable to provide artificial islands for the purposes of map correction.

As will be appreciated by the skilled person, operating according to the preferred embodiment of the invention described above is very convenient also in respect of the boundaries, since the wire or coil may be embedded in the soil, thus avoiding any actual or even aesthetic disturbance to the working area, and the power requirements to generate a localized magnetic field are very small.

FIG. 4 shows an alternative embodiment of the invention, in which the location of each point is measured in Cartesian coordinates. As will be appreciated by the skilled person, it is not essential to the invention that any specific coordinates system be chosen, but it may be more convenient to select a particular set of coordinates, depending on the map correction process employed.

One particular process, employing Cartesian coordinates, will be described hereinafter by way of example, with reference to the flow-sheet of FIG. 5.

In FIG. 5A the correction of an error on one axis (Y in the example shown in the flow-sheet of FIG. 5A) is shown, according to one possible embodiment of the invention, while the error in the other axis is not dealt with. FIG. 5B, on the other hand, shows a method according to another possible embodiment of the invention, in which both the X and the Y errors are corrected in one step. It should be noted that, although only the error on one axis can be corrected at a time in the embodiment of FIG. 5A, the error on the other axis can be corrected by moving in a direction perpendicular to the axis being corrected. The movement of the robot can be programmed such that both the X and Y location coordinates are updated at a suitable rate of correction.

In FIG. 5B another preferred embodiment of the invention is shown, in which the boundaries are marked with markers (4 in FIG. 5B), which have a unique identity. The markers will typically be conveniently evenly spaced, although any spacing scheme is possible. The markers can be of any suitable type, e.g., and RF tag, magnetic tag or the like marker, which emits a signal identifiable by a sensor. In such a case, of course, a suitable sensor, capable of identifying unique identity signals must also be provided on the robot.

During the initiation process the robot performs a complete loop around the edge and memorizes the shape of the boundary as well as the position of each marker (X,Y coordinates of each individual marker). This procedure allows for the correction of both the X and the Y coordinates error, each time an edge is detected, according to the method shown in the flow-sheet of FIG. 5B.

Figure 6:
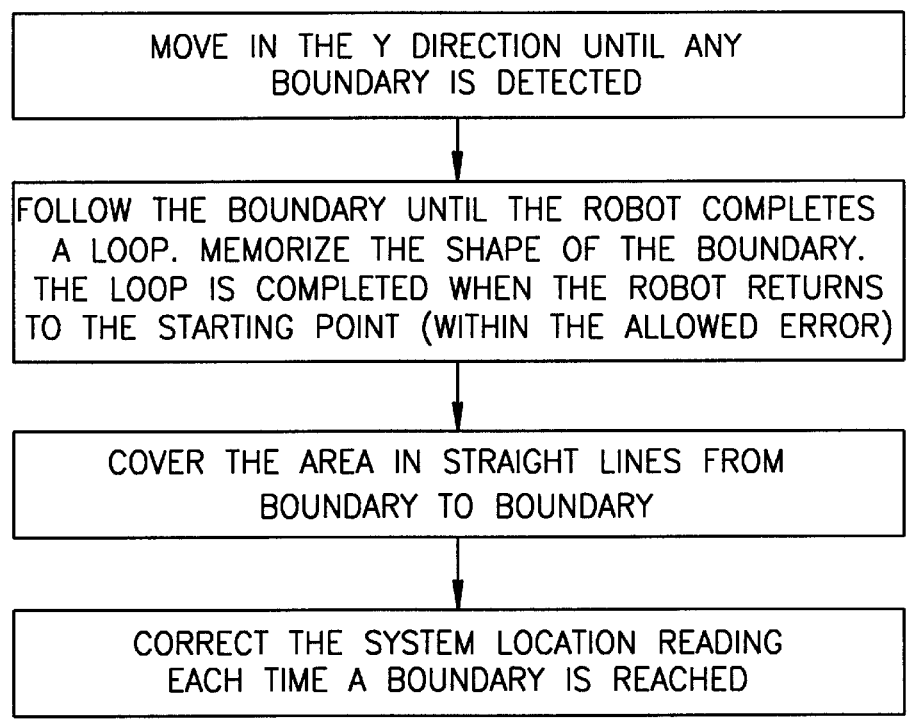
FIG. 6 is a flow chart of the operation of a system, according to one preferred embodiment of the invention.

Schematically speaking, the robot will operate according to the flow-sheet of FIG. 6.

Figure 7:
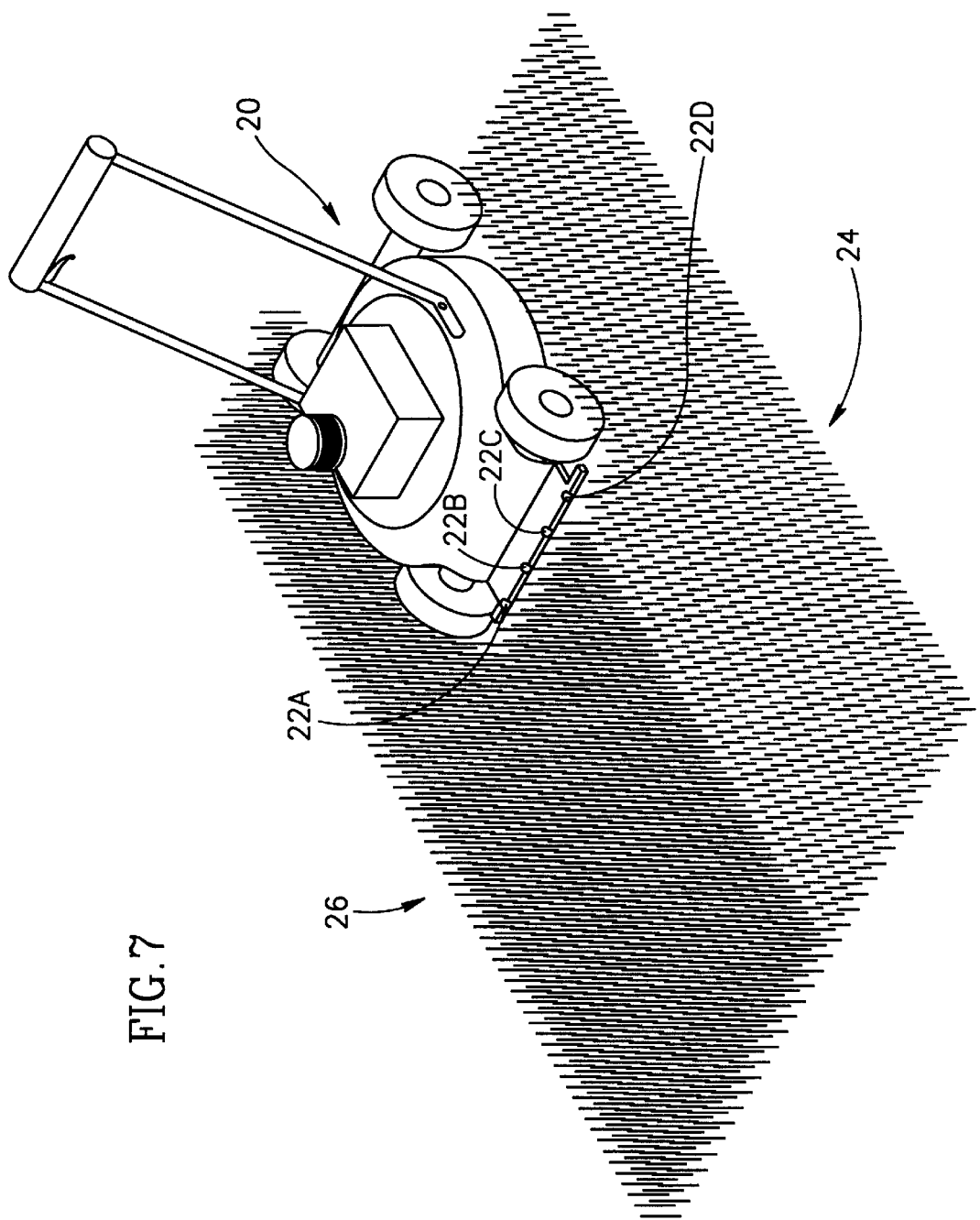
FIG. 7 is a pictorial illustration of a lawnmower following the line of cut grass, constructed and operative in accordance with a further preferred embodiment of the present invention.
Figure 8:
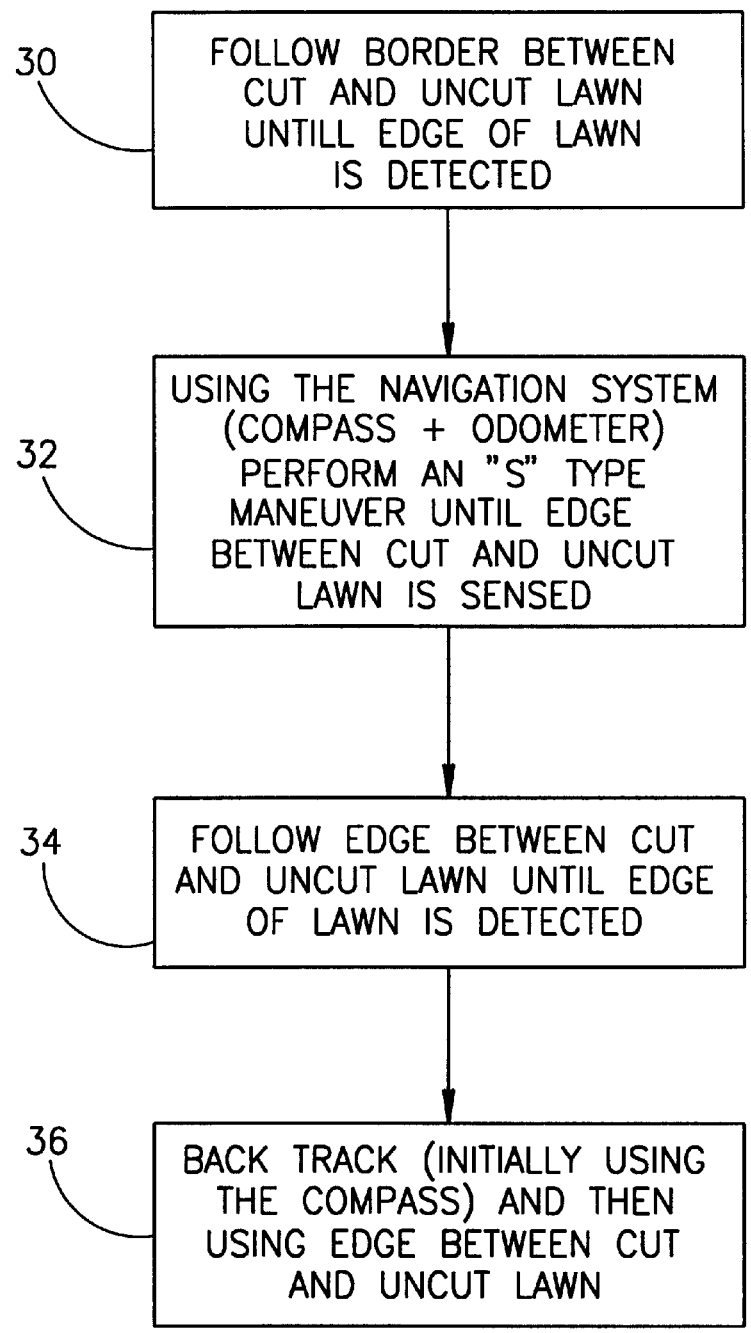
FIG. 8 is a flow chart illustration of a method of operating the lawnmower of FIG. 7.
Figure 9:
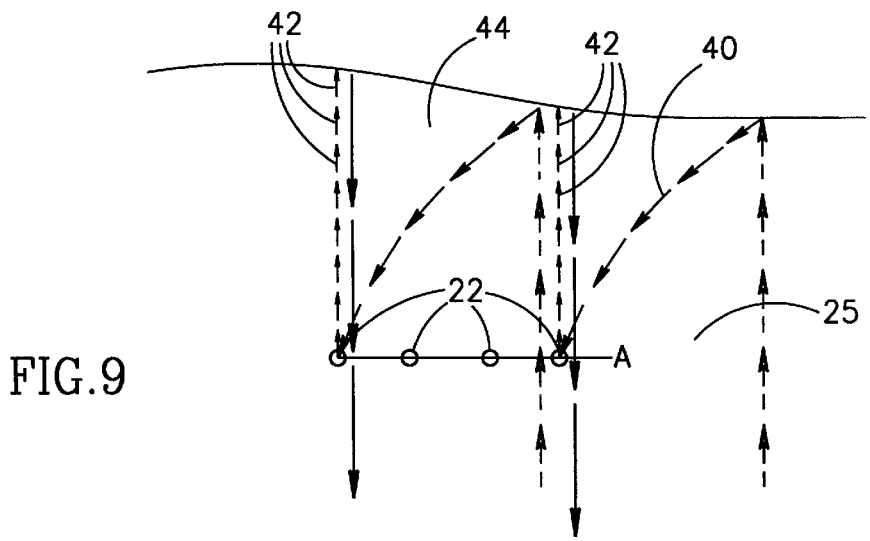
FIG. 9 is a pictorial illustration useful in understanding the method of FIG. 8.

Reference is now made to FIGS. 7, 8 and 9 which illustrate a further embodiment of the robotic lawnmower of the present invention. In this embodiment, the robot sweeps the space with overlapping straight lines by determining the location of the edge between uncut and cut grass.

In the present embodiment, the lawnmower, labeled 20 in FIG. 7, additionally includes a plurality of sensors 22, each one measuring the height of the grass in its general vicinity. FIG. 7 shows two areas, one 24 of cut grass and one 26 of uncut grass. Thus, sensors 22a and 22b will provide a high height output and sensors 22c and 22d will provide a low height output.

Figure 10:
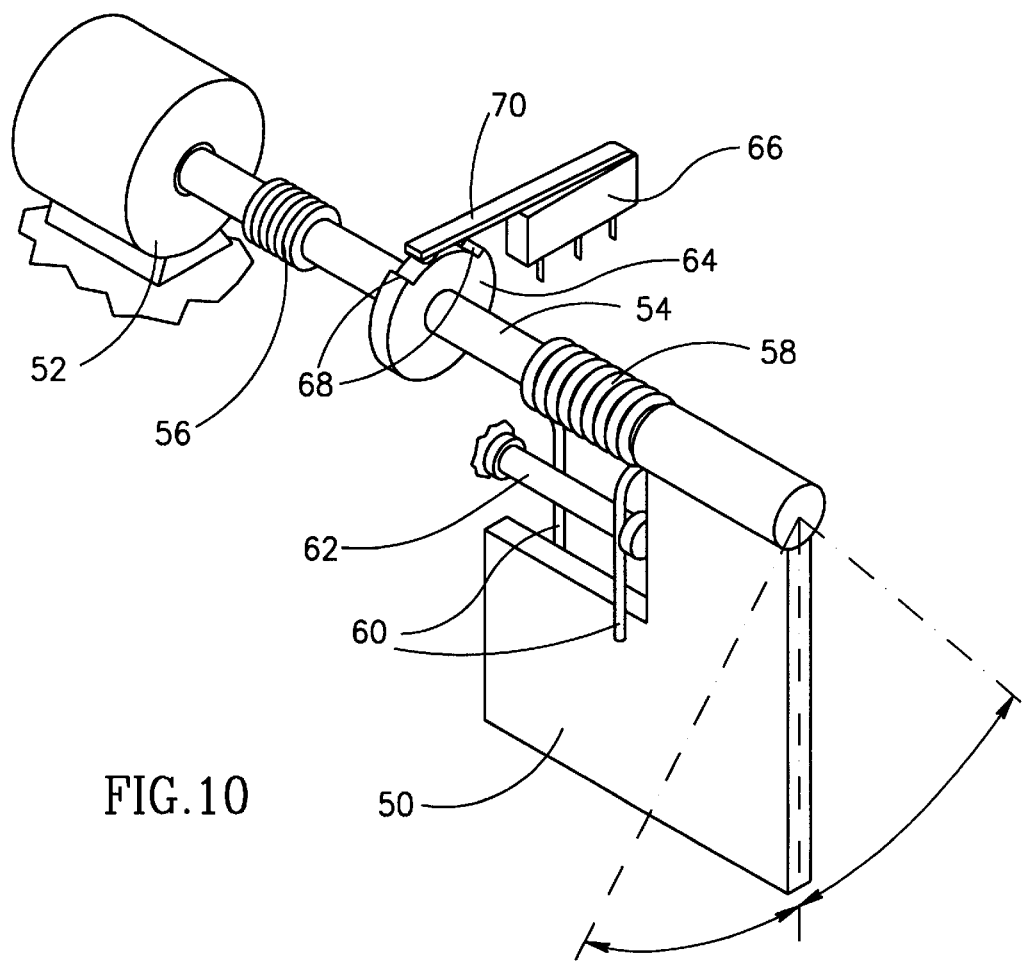
FIG. 10 is a schematic illustration of a lawn height sensor, useful in the method of FIG. 8, FIGS. 11A and 11B are schematic illustrations of a lawnmower, a sensor and two types of boundary markings, forming further embodiments of the present invention.

By comparing the height output of the sensors 22, the control system of the lawnmower can determine generally where the edge between cut and uncut grass is. One embodiment of a sensor 22 is illustrated in FIG. 10 and described in detail hereinbelow.

FIG. 8 details the operations performed by the control system of lawnmower 20 and FIG. 9 illustrates the movements of the lawnmower 20 at the edge of the lawn. While the lawnmower 20 is cutting a swath 25 indicated by dotted arrows in FIG. 9, the sensors 22 continually measure the height of the lawn nearby (step 30). The control system, with the navigation system (compass and odometer), steers the lawnmower 20 in the desired direction, as described hereinabove, while additionally ensuring that the edge of the lawn is maintained in a desired location vis-a-vis the sensors 22. For example, it may be desired to cut a swath which is only three-quarters the width of the lawnmower. For this situation, the edge between cut and uncut grass should be maintained between sensors 22a and 22b or between sensors 22c and 22d.

The control system maintains the desired direction until the edge of the lawn is detected, as described hereinabove. At this point, the lawnmower 20 must change direction of movement while keeping the proper percentage of uncut grass under the lawnmower 20. It is noted that the lawnmower can move both forward and backward.

FIG. 9 illustrates the change in direction. Initially, the lawnmower 20 moves in the forward direction along swath 25 (step 30). Upon reaching the edge, the lawnmower 20 performs an 'S' shaped backwards maneuver, labeled 40, using the navigation system, until the edge between cut and uncut lawn is sensed between the desired two sensors 22. This step is indicated in step 32 of FIG. 8 and produces an 'S' shaped cut in the lawn. As shown by line A in FIG. 9, the edge of the cut grass is maintained between the desired two sensors 22.

In step 34, the lawnmower 20 moves forward along the edge of the cut grass until the edge of the lawn is sensed once again. This movement is indicated by the short arrows 42 of FIG. 9. Finally, the lawnmower 20 backtracks along the new swath 44. Initially and until reaching the location of the line A, the lawnmower 20 utilizes only the compass information. Once the edge of cut grass is found again (at the location of line A), the control system utilizes both the compass and the sensor output to create the new swath 44. This is indicated at step 36 of FIG. 8.

As discussed with respect to the previous embodiments, the lawnmower 20 has to return to locations of unfinished scanning, such as locations on the opposite side of a flower bed or tree. To do so, the lawnmower 20 utilizes the navigation system to head towards the desired location and, when it is close to the desired location, it additionally senses for the edge between cut and uncut grass.

Reference is now made to FIG. 10 which illustrates an exemplary lawn height sensor. The lawn sensor comprises a rotatable wing 50 connected to a potentiometer 52 via a pin 54 and a flexible joint 56. A weak spring 58 is attached around pin 54 and extensions 60 of spring 58 extend on either side of wing 50 and of a fixed pin 62. A cam 64 is connected also to pin 54 and a microswitch 66 measures the movement of cam 64.

The grass presses against the wing 50, which, since it is not heavy, will rotate. In turn, the wing 50 pushes against the relevant one of extensions 60. Since the other extension 60 is maintained in place by fixed pin 62, the spring 58 is tightened, thereby providing a returning force against the force of the grass.

The rotation of the wing causes the cam 64 and flexible joint 56 to rotate, which rotation is measured by the potentiometer 52. Furthermore, if the wing 50 rotates too far, protrusions 68 of cam 64 will press against a rod 70 connected to microswitch 66 which will indicate maximum travel of wing 50.

Figure 11A:
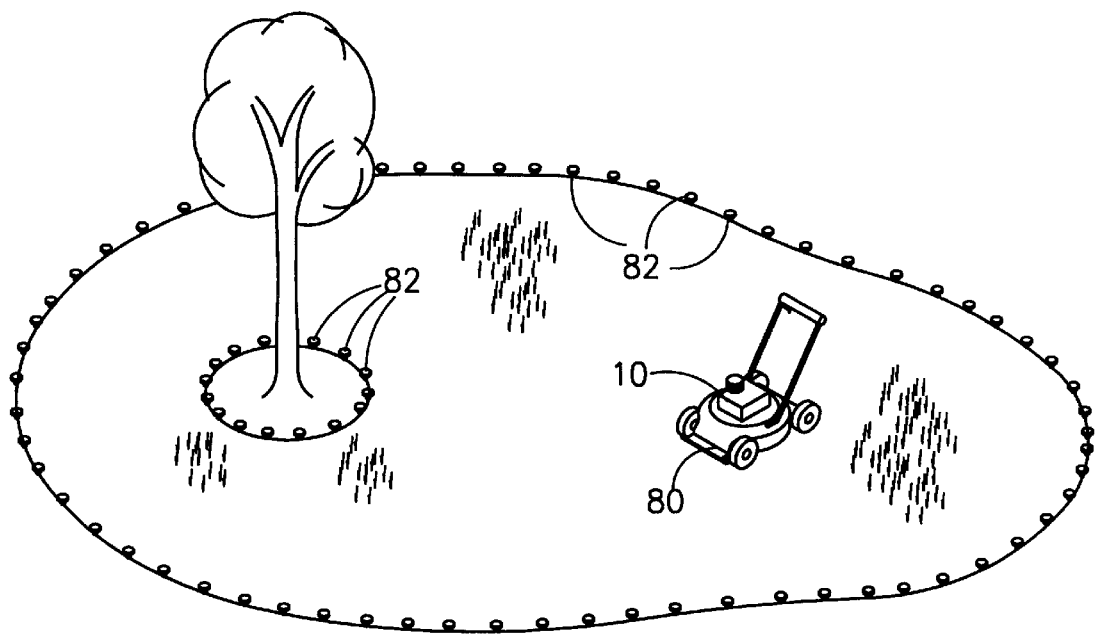
Figure 11B:
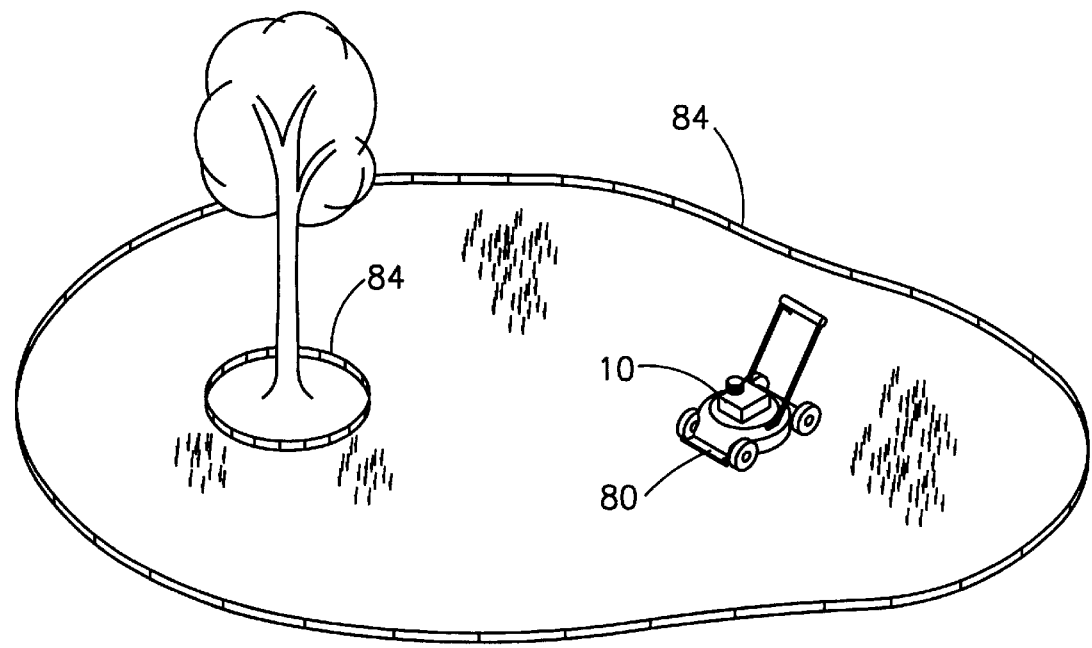

Reference is now made to FIGS. 11A and 11B which illustrate two alternative embodiments of boundary markers and a sensor for detecting the boundary markers located on the lawnmower. Reference is also made to FIGS. 12A, 12B, 13A, 13B, 14A, 14B, 15 and 16 which illustrate additional types of boundary markers.

FIGS. 11A and 11B illustrate the lawnmower 10 with a boundary sensor 80 attached thereto. In FIG. 11A, the boundary is marked by a series of markers 82 placed into the ground on the edge of the lawn. Typically, the markers are placed at set distances one from the next. Alternatively, they can be placed close together along portions of the edge which are very curvy and further apart along straighter portions of the edge. In FIG. 11B, the boundary is marked by a wire 84 which is marked 82 some suitable and detectable manner. The type of marking matches the type of sensor attached to the lawnmower 10.

In one embodiment, shown in FIGS. 12A and 12B, the boundary markers 82 have a magnet therein. In the embodiment of FIG. 12A, the boundary marker 82 is formed of a plastic pin 90, a magnet 92 placed within pin 90 and a plastic cover 94 covering the magnet-pin unit. In the embodiment of FIG. 12B, the boundary marker 82 is a metallic pin which is magnetized, as shown.

The corresponding sensor 80, for both embodiments, is a gauss meter, such as the model 4048 manufactured by F. W. Bell Inc. of the USA, or any other magnetometer which senses the magnetism in the combined unit. The distances between the boundary markers 82 are defined by the strength of the magnet 92 in such a way that at any point along the marked perimeter, at least two markers are detectable by the sensor on the robot.

In a further embodiment, shown in FIGS. 13A and 13B, the sensor 82 is a bar code reader, such as the model 1516 from Intermek Inc. of Seattle, Wash., USA. The corresponding boundary markers are, in FIG. 13A, a white cable 96 with black bar code markings 98 thereon. The bar code markings 98 are located at fixed distances from each other. In FIG. 13B, the boundary markers are pins (typically of white plastic) with black markings 100 thereon.

Figure 14A:
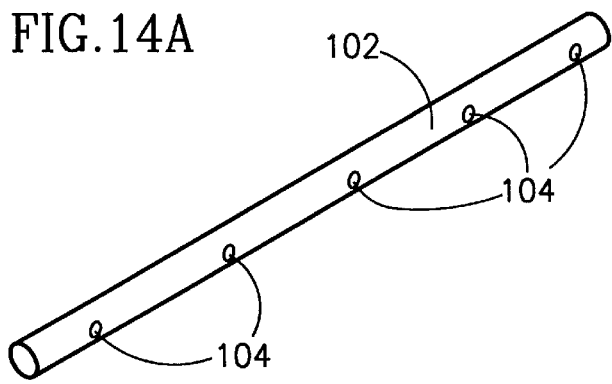
Figure 14B:
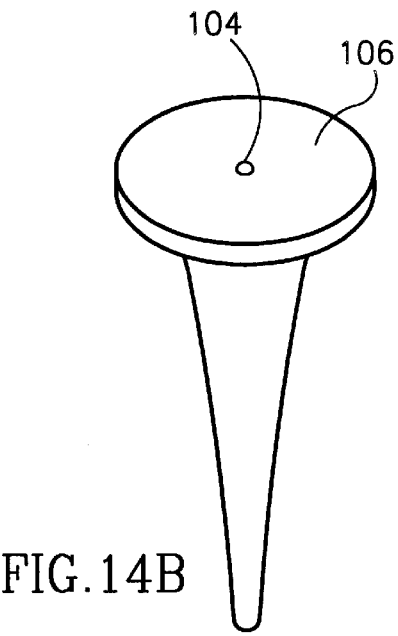

FIGS. 14A and 14B illustrate a further embodiment which utilizes a Geiger counter, or other suitable radiometer, to detect the boundary markers. FIG. 14A illustrates a cable 102 having a piece of a radioactive mineral 104, such as Americium, located thereon and FIG. 14B illustrates an individual pin 106 (typically of plastic) having a radioactive mineral 104 thereon. A suitable Geiger counter for use with lawnmower 10 is the SURVIVOR 200, manufactured by Bicron Inc. of the USA.

Figure 15:
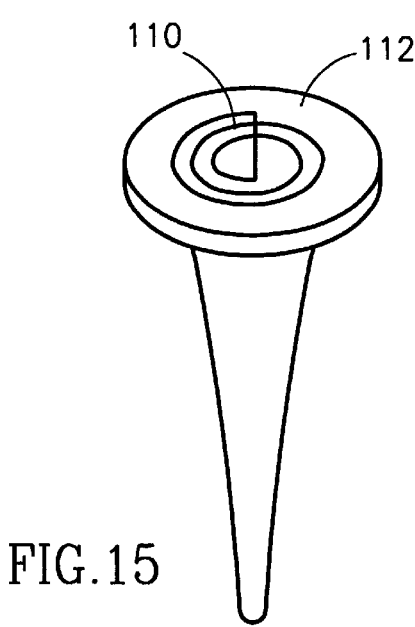

FIG. 15 illustrates a coil-capacitor circuit 1 10 incorporated into a plastic or ceramic substance 112. Such a circuit 110 is then placed into a pin unit such as pin 90 and cover 94 of FIG. 12A. The corresponding sensor 80 is a resonance tag reader such as the ones manufactured by Checkpoint Inc. of Thorofare, N.J., USA, for anti-theft protection in stores, such as clothing stores. The coil-capacitor unit 110 can be similar to those manufactured by Checkpoint or any other suitable coil-capacitor unit.

Figure 16:
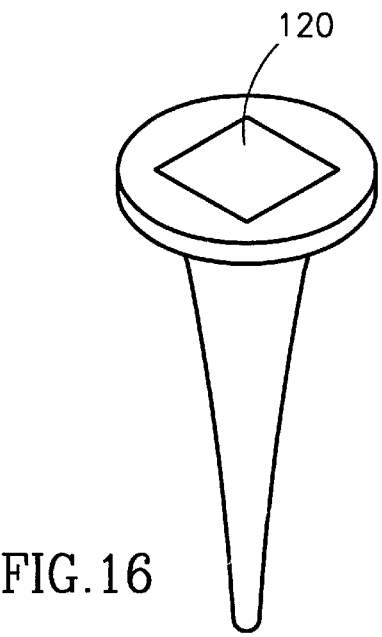

FIG. 16 illustrates a further embodiment utilizing transceiver units 120. The transceiver unit 120 can be any suitable narrow band transmitting and receiving unit and is typically placed into a pin unit such as pin 90 and cover 94 of FIG. 12A. The corresponding sensor is a similar transceiver. Each transceiver, within each pin, operates at the same frequency and the sensor transceiver continually determines how close it is to the nearest transceiver unit 120. When the sensor transceiver comes to within a predetermined distance, the sensor transceiver determines that it has reached the boundary.

For all of the above embodiments, the sensor 80 determines that the lawnmower 10 has reached the boundary when the signal sensor 80 receives is at or above a threshold level which is calculated as the expected reading five to ten inches from the marker or cable.

It will be appreciated that other types of markers and their corresponding detectors are incorporated within the present invention.

All the above description and examples have been provided for the purpose of illustration, and are not intended to limit the invention in any way. Many modifications can be effected in the method and devices of the invention, without departing from its spirit.

What is claimed is:

1. A method for automatically operating a robot within a working area enclosed by a boundary comprising the steps of:

provic a boundary along edges of an area so as to provide a boundary outlining the working area, said boundary being detectable by a sensor;

providing boundaries along edges of each area enclosed in the working area, in which it is desired that the robot should not operate, said boundaries also being detectable by a sensor;

providing a sensor positioned on the robot, said sensor for detecting said boundaries;

providing processing means connected to said sensor and receiving an input therefrom;

providing location means on said robot to determine the coordinates of the robot relative to an arbitrary origin, at any specific time;

providing direction finding means on said robot;

providing memory means to store values generated by said processing means and, optionally, by said location means;

moving said robot into said area:

(a) causing the robot to move along each of the boundaries provided around or within said working area and to make a complete traversal of said boundary outlining said working area, to detect said boundaries and to memorize their shape, and to store in the memory means values representative of the coordinates of said boundaries, relative to an arbitrary origin, thereby to initially generate a basic map of the working area;

(b) causing the robot to start from an arbitrary starting point having known coordinates within the basic map of the working area;

(c) causing said robot to move autonomously along a path, said path comprising at least a plurality of substantially straight lines between portions of said boundaries, and to detect a boundary when in the vicinity of the boundary; and (d) during said movement:

continuously determining the coordinates of the robot by analyzing data obtained from the location means and by detecting the vicinity of a boundary; and correcting the actual position of the robot on the basic map by comparing the calculated and the actual coordinates of each detected boundary.

2. A method according to claim 1, wherein the location means comprise movement measuring means.

3. A method according to claim 2, wherein the movement measuring means comprise an odometer.

4. A method according to claim 1, wherein the robot is coupled to a selected one of the group of: a vacuum cleaner, a floor sweeper and a floor polisher.

5. A method according to claim 1, wherein the robot is coupled to a lawn mower.

6. A method according to claim 5 and including the steps of:

providing the lawnmower with at least a plurality of lawn height sensors;

cutting a first swath of lawn in a first direction;

performing a maneuver, under control of said robot and in response to output of said lawn height sensors, in a second direction generally opposite of said first direction to bring said lawnmower to a location parallel to but overlapping said first swath by a predetermined percentage as indicated by the different output of said lawn height sensors;

cutting a second swath of lawn parallel to said first swath while continually monitoring the lawn height output of said lawn height sensors thereby to ensure that the percentage of overlap is generally maintained;

repeating said steps of performing a maneuver and cutting a second swath for further swaths of lawn, wherein the previously cut lawn is denoted by said first swath of lawn and the swath to be cut is denoted by said second swath of lawn.

7. The method of claim 1, wherein said step of causing said robot to move autonomously along a path, includes moving along said path substantially free of repetition.

8. A method according to claim 1 wherein the sensor is a proximity sensor.

9. A method according to claim 8, wherein the boundary comprises a metallic wire through which electric current flows, and the proximity sensor comprises a magnetic field detector.

10. A method according to claim 8, wherein the boundary comprises a guide wire through which an acoustic signal passes, and the proximity sensor comprises an acoustic detector.

11. A method according to claim 8, wherein the boundary comprises passive metallic means which is excitable by a magnetic field, and the proximity sensor comprises an electric field detector.

12. A method according to claim 8, wherein the boundary comprises passive magnetic means, and the proximity sensor comprises a magnetic field detector.

13. A method according to claim 10, wherein the acoustic signal is in the ultra-sound range.

14. A method according to claim 12, wherein said passive magnetic means comprises a plurality of pins having magnets therein.

15. A method according to claim 12, wherein said passive magnetic means comprises a multiplicity of magnets each shaped into the form of pins.

16. A method according to claim 8, wherein the proximity sensor comprises a high contrast pattern code reader and the boundary comprises high contrast pattern means.

17. A method according to claim 16, wherein the boundary comprises a two color guide wire having patterns of a first color at fixed distances thereon and a second color for the non-patterned portions of the guide wire.

18. A method according to claim 16, wherein the boundary comprises a multiplicity of pins each having a high contrast pattern thereon.

19. A method according to claim 8, wherein the proximity sensor comprises a radiometer and the boundary comprises radioactive means.

20. A method according to claim 19, wherein the boundary comprises a guide wire having a radioactive unit placed at fixed distances thereon.

21. A method according to claim 19, wherein the boundary comprises a multiplicity of pins each having a radioactive unit thereon.

22. A method according to claim 8, wherein the proximity sensor comprises a resonance tag meter and the boundary comprises a multiplicity of pins having at least one coil-capacitive circuit therein.

23. A method according to claim 8, wherein the proximity sensor comprises a transceiver and the boundary comprises a multiplicity of pins having at least one transceiver therein.

24. A system for automatically operating a robot within a working area enclosed by a boundary, comprising:

boundary means suitable for positioning along the edges of the working area, and of each area enclosed in the working area, in which it is desired the robot not to operate, said boundary means being detectable by a sensor; and a robot comprising:

a sensor for detecting said boundary means;

processing means on said robot in operative communication with said sensor and receiving an input therefrom, said processing means including means for initially generating a map of said working area in accordance with a complete traversal of said boundary means;

location means on said robot, to determine the coordinates of the robot relative to an arbitrary origin, at any specific time;

memory means to store values generated by said processing means;

direction finding means position on said robot, to determine the direction of travel thereof; and motion means, to cause the robot to move in a substantially continuous operative mode, in a plurality of substantially straight lines between portions of said boundary means within said working area.

25. A system according to claim 24, wherein the boundaries are provided with a plurality of individually recognizable markers.

26. A system according to claim 25, wherein the markers are substantially located at even distances from one another.

27. A system according to claim 25, wherein the marker comprises an RF tag or a magnetic tag.

28. A system according to claim 24, wherein the movement measuring means comprise an odometer.

29. A system according to claim 24, wherein the robot is coupled to a lawn mower.

30. A system according to claim 24, wherein the robot is coupled to a device selected from the group of: a vacuum cleaner, a floor sweeper and a floor polisher.

31. A system according to claim 29 and additionally including a plurality of lawn height sensors for measuring the height of the lawn and means for controlling said lawn mower to cut the lawn along an already cut swath of grass.

32. The system of claim 24, additionally comprising, said location means, said motion means and said memory means in operative communication for moving said robot in said operative mode within said working area along a path substantially free of repetition.

33. A system according to claim 24 wherein the sensor is a proximity sensor.

34. A system according to claim 33, wherein the boundary means which is detectable by a proximity sensor comprises a metallic wire through which electric current flows, and the proximity sensor comprises a magnetic field detector.

35. A system according to claim 33, wherein the boundary which is detectable by a proximity sensor comprises a guide wire through which an acoustic signal passes, and the proximity sensor comprises an acoustic detector.

36. A system according to claim 33, wherein the boundary which is detectable by a proximity sensor comprises a passive metallic means which is excitable by a magnetic field, and the proximity sensor comprises an electric field detector.

37. A system according to claim 33, wherein the boundary which is detectable by a proximity sensor comprises passive magnetic means, and the proximity sensor comprises a magnetic field detector.

38. A system according to claim 33, wherein the boundary comprises passive magnetic means, and the proximity sensor comprises a magnetic field detector.

39. A system according to claim 38, wherein said passive magnetic means comprises a plurality of pins having magnets therein.

40. A system according to claim 38, wherein said passive magnetic means comprises a multiplicity of magnets each shaped into the form of pins.

41. A system according to claim 33, wherein the proximity sensor comprises a high contrast pattern code reader and the boundary comprises high contrast pattern means.

42. A system according to claim 41, wherein the boundary comprises a two color guide wire having patterns of a first color at fixed distances thereon and a second color for the non-patterned portions of the guide wire.

43. A system according to claim 41, wherein the boundary comprises a multiplicity of pins each having a high contrast pattern thereon.

44. A system according to claim 33, wherein the proximity sensor comprises a radiometer and the boundary comprises radioactive means.

45. A system according to claim 44, wherein the boundary comprises a guide wire having a radioactive unit placed at fixed distances thereon.

46. A system according to claim 44, wherein the boundary comprises a multiplicity of pins each having a radioactive unit thereon.

47. A system according to claim 33, wherein the proximity sensor comprises a resonance tag meter and the boundary comprises a multiplicity of pins having at least one coil-capacitive circuit therein.

48. A system according to claim 33, wherein the proximity sensor comprises a transceiver and the boundary comprises a multiplicity of pins having at least one transceiver therein.

* * * * *